US012098278B2

(12) United States Patent
Aso et al.

(10) Patent No.: US 12,098,278 B2
(45) Date of Patent: Sep. 24, 2024

(54) POLYAMIDE RESIN COMPOSITION

(71) Applicant: TOYOBO MC Corporation, Osaka (JP)

(72) Inventors: Hideo Aso, Yamaguchi (JP); Shuji Kubota, Osaka (JP); Yoshitaka Ayuzawa, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 485 days.

(21) Appl. No.: 17/440,345

(22) PCT Filed: Mar. 12, 2020

(86) PCT No.: PCT/JP2020/010825
§ 371 (c)(1),
(2) Date: Sep. 17, 2021

(87) PCT Pub. No.: WO2020/189501
PCT Pub. Date: Sep. 24, 2020

(65) Prior Publication Data
US 2022/0195185 A1    Jun. 23, 2022

(30) Foreign Application Priority Data
Mar. 20, 2019   (JP) .................................. 2019-052997

(51) Int. Cl.
*C08L 77/02* (2006.01)
*C08K 3/34* (2006.01)
*C08K 5/098* (2006.01)

(52) U.S. Cl.
CPC ................ *C08L 77/02* (2013.01); *C08K 3/34* (2013.01); *C08K 5/098* (2013.01); *C08K 2201/005* (2013.01); *C08L 2203/30* (2013.01)

(58) Field of Classification Search
CPC ........ C08K 2201/003; C08K 2201/005; C08K 3/34; C08K 3/346; C08K 5/098; C08L 77/02; C08L 77/06
See application file for complete search history.

(56) References Cited

U.S. PATENT DOCUMENTS

| | | |
|---|---|---|
| 2011/0305871 A1 | 12/2011 | Tabuchi et al. |
| 2014/0010980 A1 | 1/2014 | Hirayama et al. |

FOREIGN PATENT DOCUMENTS

| | | |
|---|---|---|
| CN | 103814082 | 5/2014 |
| JP | 53-42352 | 11/1978 |
| JP | 58-71949 | 4/1983 |
| JP | 2004-346240 | 12/2004 |
| JP | 2007-077309 | 3/2007 |
| JP | 2013-057003 | 3/2013 |
| JP | 2015-98581 | 5/2015 |
| JP | 2015-214159 | 12/2015 |
| JP | 2017-30977 | 2/2017 |
| JP | 2018-95852 | 6/2018 |
| JP | 2018-193547 | 12/2018 |
| JP | 2018-203984 | 12/2018 |
| JP | 2019-11387 | 1/2019 |
| JP | 2019-11388 | 1/2019 |
| JP | 2019-039061 | 3/2019 |
| WO | 2010/092921 | 8/2010 |
| WO | 2013/069365 | 5/2013 |
| WO | 2015/093450 | 6/2015 |
| WO | 2018/143110 | 8/2018 |

OTHER PUBLICATIONS

International Preliminary Report on Patentability issued Sep. 16, 2021 in International (PCT) Application No. PCT/JP2020/010825.
Notice of Reasons for Refusal issued Dec. 15, 2023 in corresponding Japanese Patent Application No. 2021-507277, with English language translation.
Office Action issued Nov. 23, 2022 in corresponding Chinese Patent Application No. 202080018467.2, with English-language translation.
Decision of Rejection issued Apr. 27, 2023 in corresponding Chinese Patent Application No. 202080018467.2, with English translation.
First Office Action issued Nov. 23, 2022, in Chinese Patent Application No. 202080020561.1, with English language translation.
International Search Report issued Jun. 2, 2020, in International (PCT) Application No. PCT/JP2020/010826.
Sasimowski et al. "Influence of the Conditions of Corotating Twin-Screw Extrusion for Talc-Filled Polypropylene on Selected Properties of the Extrudate," Polymers 2019, 11, 1460, pp. 1-18. (Sep. 6, 2019).
English machine translation of JP 2019-011387A (Year: 2019).
English machine translation of JP 2019-011388A (Year: 2019).
Office Action issued Nov. 7, 2023, in Chinese Patent Application No. 202080020561.1, with English language translation.
Notice of Reasons for Refusal issued Aug. 18, 2023, in Japanese Patent Application No. 2021-507278, with English language translation.
Office Action issued May 19, 2023, in Chinese Patent Application No. 202080020561.1, with English language translation.

(Continued)

*Primary Examiner* — Ana L. Woodward
(74) *Attorney, Agent, or Firm* — Wenderoth, Lind & Ponack, L.L.P.

(57) ABSTRACT

The present invention is a polyamide resin composition which contains 50 to 90% by mass of a crystalline polyamide resin (A) and 9 to 49% by mass of a talc (B). The average particle size of secondary particles of the talc (B) in the polyamide resin composition is 30 μm or less. The polyamide resin composition has an exothermic peak present on a high temperature side of a maximum exothermic peak of a crystallization temperature during cooling in a cooling process of measurement by means of a differential scanning calorimeter. Variations in physical characteristics such as a molding shrinkage, mechanical characteristics, and a heat distortion temperature of the polyamide resin composition are suppressed among different production machines or different production lots. Consequently, characteristics within desired ranges are stably obtained.

19 Claims, 2 Drawing Sheets

(56) References Cited

OTHER PUBLICATIONS

International Preliminary Report on Patentability and Written Opinion issued Sep. 16, 2021, in International (PCT) Patent Application No. PCT/JP2020/010826.
International Search Report issued May 26, 2020 in International (PCT) Application No. PCT/JP2020/010825.
Notice of Reasons for Refusal issued Aug. 10, 2023 in corresponding Japanese Patent Application No. 2021-507277, with English language translation.
The Decision of Refusal issued May 1, 2024, in corresponding Japanese Patent Application No. 2021-507277, with English translation.
The Decision of Dismissal of Amendment issued May 1, 2024, in corresponding Japanese Patent Application No. 2021-507277, with English translation.
Notice of Reasons for Refusal issued Feb. 1, 2024 in Japanese Patent Application No. 2021-507278, together with English translation.
Decision of Refusal issued Jul. 9, 2024, in Japanese Patent Application No. 2021-507278, with English translation.
Decision of Dismissal of Amendment issued Jul. 9, 2024, in Japanese Patent Application No. 2021-507278, with English translation.

100µm

100µm

POLYAMIDE RESIN COMPOSITION

TECHNICAL FIELD

The present invention relates to a polyamide resin composition, and more particularly to a polyamide resin composition containing a large amount of talc as a reinforcing material.

BACKGROUND ART

As a method for improving dimensional change, rigidity reduction, and a low heat distortion temperature and the like due to water absorption, which are drawbacks of a polyamide resin, blending of fibers such as a glass fiber and a carbon fiber, and inorganic fillers such as a talc and calcium carbonate as a reinforcing material has been widely known for a long time.

When a large amount of particulate inorganic filler such as a talc are blended, a difference in bulk density between the polyamide resin and the particulate inorganic filler is large, which makes it difficult to sufficiently mix them in simple dry blending using a single screw extruder. For this reason, a polyamide resin composition having a desired talc content has been produced by devices such as attaching a coupling agent and water to a polyamide resin, and then dusting the polyamide resin with a talc, or by mixing a talc by a side feed method using a twin screw extruder (for example, Patent Document 1).

However, even when the content of the talc is the same, physical characteristics such as a molding shrinkage, mechanical characteristics, and heat distortion temperature of the polyamide resin composition may vary among different production machines or different production lots. In particular, in the case of a molded part, stable molding shrinkage, mechanical characteristics, and heat distortion temperature and the like are required from the relationship with other parts to be assembled, which has room for improvement at present.

PRIOR ART DOCUMENT

Patent Document

Patent Document 1: JP-A-53-42352

SUMMARY OF THE INVENTION

Problems to be Solved by the Invention

Then, an object of the present invention is to solve the above-mentioned problems, that is, to obtain a polyamide resin composition in which variations in physical characteristics such as a molding shrinkage, mechanical characteristics, and a heat distortion temperature of the polyamide resin composition are suppressed among different production machines or different production lots when the content of a talc is the same, whereby characteristics within desired ranges are stably obtained.

Means for Solving the Problems

In order to solve the above-mentioned problems, the present inventors have intensively studied the aggregation characteristics of talc powder itself, the dispersibility of a talc in a polyamide resin, and the morphology of the polyamide resin composition, and the like. As a result, the present inventors have found that the dispersion and aggregation states of the talc may vary without being in a constant state depending on production machines or production lots and that the characteristics of the resin composition are stabilized by adjusting the maximum outer diameter of the aggregate of the talc to a size equal to or less than a specific value, and have achieved the present invention.

That is, the present invention relates to:

"[1] a polyamide resin composition comprising: 50 to 90% by mass of a crystalline polyamide resin (A); and 9 to 49% by mass of a talc (B), wherein: an average particle size of secondary particles of the talc (B) in the polyamide resin composition is 30 μm or less; and the polyamide resin composition has an exothermic peak present on a high temperature side of a maximum exothermic peak of a crystallization temperature during cooling in a cooling process of measurement by means of a differential scanning calorimeter.

[2]
The polyamide resin composition according to [1], wherein the polyamide resin composition further contains a coupling agent (C) and a fatty acid metal salt (D).

[3]
The polyamide resin composition according to [1] or [2], wherein the crystalline polyamide resin (A) contains an aliphatic polyamide resin.

[4]
The polyamide resin composition according to any one of [1] to [3], wherein the crystalline polyamide resin (A) contains polymetaxylylene adipamide."

The present invention can solve the problem by adopting the above configuration.

Effect of the Invention

A polyamide resin composition of the present invention is a polyamide resin composition containing a large amount of talc, but variations in physical characteristics such as a molding shrinkage, mechanical characteristics, and a heat distortion temperature are suppressed, whereby characteristics within desired ranges are stably exhibited.

MODE FOR CARRYING OUT THE INVENTION

Figure 1:
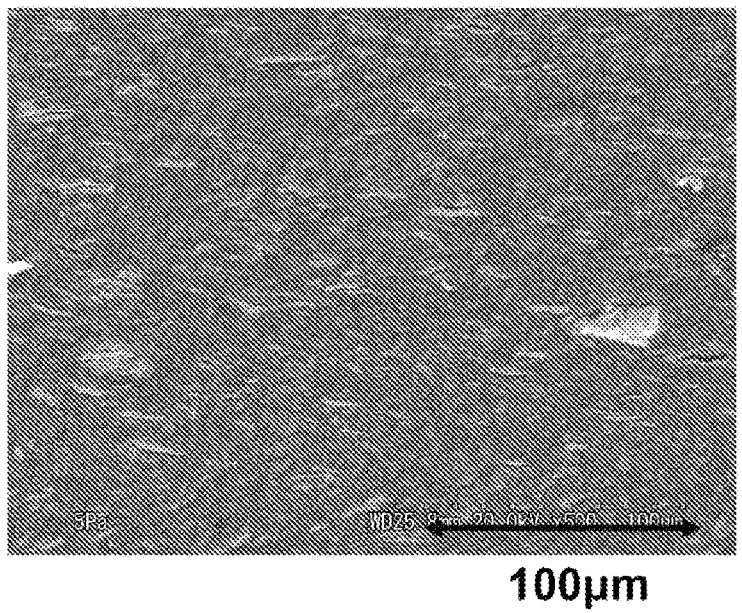
FIG. 1 shows a result of observing the cross section of a test piece obtained in Example 1 with a scanning electron microscope.

Hereinafter, the present invention will be specifically described.

A crystalline polyamide resin (A) in the present invention is a polyamide resin having an acid amide bond (—CONH—) in the molecule, and has a crystal melting point. The crystalline polyamide resin (A) preferably contains an aliphatic polyamide resin (A1). Specific examples thereof include, but are not limited to, polycaproamide (polyamide 6), polyhexamethylene adipamide (polyamide 66), polytetramethylene adipamide (polyamide 46), polyhexamethylene sebacamide (polyamide 610), polylauryl lactam (polyamide 12), poly-11-aminoundecanoic acid (polyamide 11), copolymers thereof, and blends of these polymers. The aliphatic polyamide resin (A1) is preferably polyamide 6 and polyamide 66, and more preferably polyamide 6.

In addition to the aliphatic polyamide resin (A1), it is preferable that a polyamide resin (A2) that delays the crystallization of the aliphatic polyamide resin (A1) be used in combination with the crystalline polyamide resin (A) in the present invention from the viewpoint of moldability. The polyamide resin (A2) is not particularly limited as long as the polyamide resin (A2) can delay the crystallization of the aliphatic polyamide resin (A1), but for example, a polyamide having a higher crystallization temperature than that of the aliphatic polyamide resin (A1) or a polyamide that morphologically inhibits the crystallization can be used. Specific examples thereof include polyamide MXD6 (polymetaxylylene adipamide), a hexamethylene terephthalate/hexamethylene isophthalate copolymer (6T/6I), 4,4'-diamino-3,3'-dimethyl-dicyclohexylenemethane (CA)/isophthalic acid (I)/lauryl lactam (LL) copolymer (I/CA/LL), and a terephthalic acid (T)/trimethyl-hexamethylenediamine (TMD) polymer (T/TMD). The polyamide resin (A2) is preferably polyamide MXD6 in that the appearance of a molded article can be improved. Polyamide MXD6 is particularly preferable because polyamide MXD6 can improve not only the appearance of the molded article but also the mechanical characteristics thereof.

The content ratios of the aliphatic polyamide resin (A1) and the polyamide resin (A2) are preferably 70 to 99.5 parts by mass and 0.5 to 30 parts by mass respectively, and more preferably 80 to 95 parts by mass and 5 to 20 parts by mass respectively based on 100 parts by mass of the crystalline polyamide resin (A).

The relative viscosity (96% sulfuric acid method) of the crystalline polyamide resin (A) is preferably in the range of 1.8 to 3.5, and more preferably in the range of 2.0 to 3.2. The relative viscosity of less than 1.8 tends to cause deteriorated toughness, and the relative viscosity of more than 3.5 tends to cause deteriorated fluidity. The preferable ranges of the relative viscosity are the same for the aliphatic polyamide resin (A1) and the polyamide resin (A2), and when the aliphatic polyamide resin (A1) and the polyamide resin (A2) are used in combination, a weighted average calculated from the respective content ratios is taken as the relative viscosity of the crystalline polyamide resin (A).

The blending (content) amount of the crystalline polyamide resin (A) is 50 to 90% by mass, preferably 55 to 80% by mass, more preferably 56 to 74% by mass, and still more preferably 60 to 68% by mass in the polyamide resin composition. The blending amount of less than 50% by mass makes it difficult to uniformly disperse a talc, which causes unstable performances such as mechanical characteristics. The blending amount of more than 90% by mass causes a small effect of improving impact resistance.

The average particle size of primary particles of a talc (B) in the present invention is preferably 1 to 15 μm, and more preferably 2 to 10 μm. The average particle size of more than the above range makes it difficult to cause the average particle size of secondary particles of the talc (B) in the polyamide resin composition to satisfy 30 μm or less, which causes a deteriorated flexural modulus and appearance of the molded article. Meanwhile, the average particle diameter of less than the above range is apt to cause dispersion failure. The average particle diameter can be determined from a particle diameter value of a cumulative amount of 50 wt % read from a particle size cumulative distribution curve measured by a laser diffraction method (for example, LA 920W manufactured by HORIBA, Ltd.) or a liquid phase precipitation system light transmission method (for example, model CP manufactured by Shimadzu Corporation). In the present invention, the measurement is performed by the former method.

The talc can be obtained by finely crushing a naturally occurring product by mechanical means, and precisely classifying the particles. The naturally occurring product may be classified first roughly and then more precisely. The mechanical crushing method can be performed by using crushers such as jaw, hammer, roll, and jet crushers, and mills such as screen, colloid, roller, and vibration mills. The crushed talc is classified by a wet or dry method once or repeatedly in an apparatus such as a cyclone, a cyclone air separator, a microseparator, a cyclone air separator, or a sharp cut separator in order to have an average particle size adjusted in the present invention. When the talc used in the present invention is produced, it is preferable that the talc be crushed to a specific particle size and then classified using a sharp cut separator in order to obtain the talc having a specific particle size.

The talc in the present invention is a talc particularly requiring no surface treatment or the like, but for the purpose of improving its adhesion to or dispersibility in the polyamide resin, those surface-treated with various organic titanate-based coupling agents, organic silane-based coupling agents, graft-modified polyolefins of unsaturated carboxylic acids or anhydrides thereof, fatty acids, fatty acid metal salts, and fatty acid esters and the like may be used. A granular talc granulated in a granular form using a water-soluble polymer binder may be used.

The blending (content) amount of the talc (B) is 9 to 49% by mass, preferably 19 to 44% by mass, more preferably 25 to 43% by mass, and still more preferably 31 to 39% by mass in the polyamide resin composition. The blending amount of less than 9% by mass causes a small effect of improving mechanical characteristics. The blending amount of more than 49% by mass makes it difficult to provide uniform dispersion in the polyamide resin, whereby the mechanical characteristics and the appearance of the molded article tend to be unstable.

The polyamide resin composition of the present invention preferably contains a coupling agent (C) and a fatty acid metal salt (D) in addition to the crystalline polyamide resin (A) and the talc (B).

As the coupling agent (C), a silane-based coupling agent and a titanate-based coupling agent and the like can be used.

Examples of the silane-based coupling agent include alkoxy group-containing silanes such as methyltrimethoxysilane, octadecyltrimethoxysilane, phenyltrimethoxysilane, and methacryloxypropyltrimethoxysilane; aminosilane-based coupling agents such as aminopropyltrimethoxysilane, aminopropyltriethoxysilane, ureidopropyltriethoxysilane, N-phenylaminopropyltrimethoxysilane, and N-2-(aminoethyl)aminopropyltrimethoxysilane; epoxysilane-based coupling agents such as glycidoxypropyltrimethoxysilane, glycidoxypropyl triethoxysilane, glycidoxypropylmethyldiethoxysilane, glycidylbutyltrimethoxysilane, and (3,4-epoxycyclohexyl)ethyltrimethoxysilane; mercaptosilane-based coupling agents such as mercaptopropyltrimethoxysilane and mercaptopropyltriethoxysilane; and organosilazane compounds such as hexamethyldisilazane, hexaphenyldisilazane, trisilazane, cyclotrisilazane, and 1,1,3,3,5,5-hexamethylcyclotrisilazane.

Examples of the titanate-based coupling agent include tetrakis(2-ethylhexyloxy)titanium, titanium-i-propoxyoctylene glycolate, di-i-propoxy-bis(acetylacetonate)titanium, propanedioxytitanium bis(ethylacetoacetate), tri-n-butoxytitanium monostearate, di-i-propoxytitanium distearate, butyl titanate dimer, titanium octylene glycolate, diisopropoxytitanium bis(triethanolaminate), dihydroxytitanium bislactate, dihydroxybis(ammonium lactate)titanium, bis(dioctyl pyrophosphate)ethylene titanate, bis(dioctyl pyrophosphate)oxyacetate titanate, tri-n-butoxytitanium monostearate, tetra-n-butyl titanate, tetraisopropyl bis(dioctyl phosphite)titanate, tetraoctyl bis(ditridecyl phosphite)titanate, tetra(2,2-diallyloxymethyl-1-butyl)bis(ditridecyl)phosphite titanate, isopropyl trioctanoyl titanate, isopropyl tricumyl phenyl titanate, isopropyl triisostearoyl titanate, isopropyl isostearoyl diacrylic titanate, isopropyl dimethacryloyl isostearoyl titanate, isopropyl tri(dioctyl phosphate)titanate, isopropyl tridodecylbenzene sulfonyl titanate, isopropyl tris(dioctyl pyrophosphate)titanate, and isopropyl tri(N-amidoethyl-aminoethyl)titanate.

The blending (content) amount of the coupling agent (C) is preferably 0.01 to 1% by mass, more preferably 0.05 to 0.8% by mass, and still more preferably 0.1 to 0.5% by mass in the polyamide resin composition. The blending amount of the coupling agent (C) is preferably 0.1 to 4.0% by mass, and more preferably 0.2 to 2.0% by mass with respect to the talc (B).

The fatty acid metal salt (D) is blended for the purpose of suppressing the aggregation of the talc to exhibit good appearance and physical properties. The fatty acid metal salt (D) is preferably a metal salt of a fatty acid having 9 to 30 carbon atoms. Examples thereof include calcium stearate, magnesium stearate, zinc stearate, calcium behenate, magnesium behenate, zinc behenate, zinc montanate, calcium montanate, magnesium montanate, calcium melisinate, magnesium melisinate, zinc melisinate, calcium cerotate, magnesium cerotate, zinc cerotate, calcium lignocerate, magnesium lignocerate, and zinc lignocerate. Among these metal salts, a calcium salt, magnesium salt, or zinc salt of a fatty acid having 15 to 28 carbon atoms is preferable. In particular, calcium stearate, magnesium stearate, zinc stearate, calcium behenate, magnesium behenate, zinc behenate, zinc montanate, calcium montanate, and magnesium montanate and the like are preferable in terms of performance and ease of availability. These metal salts can be produced by a synthesis method (double decomposition method) in which a carboxylic acid compound and a metal hydroxide are reacted, followed by washing with water, dehydrating, and drying, or a method (direct method) in which the carboxylic acid compound and the metal hydroxide are directly reacted without using water.

The blending (content) amount of the fatty acid metal salt (D) is preferably 0.01 to 2% by mass, more preferably 0.05 to 1.5% by mass, and still more preferably 0.1 to 1% by mass in the polyamide resin composition.

In the polyamide resin composition of the present invention, it is necessary that 50 to 90% by mass of the crystalline polyamide resin (A) and 9 to 49% by mass of the talc (B) (preferably, the talc having an average particle size of primary particles of 15 μm or less) are melt-kneaded, and the average particle size of secondary particles of the talc (B) in the polyamide resin composition is 30 μm or less. The average secondary particle size is preferably 25 μm or less, and more preferably 20 μm or less. When the average secondary particle size is more than 30 μm, the mechanical characteristics and appearance of the molded article are deteriorated. The lower limit of the average secondary particle size is the average particle size of primary particles (monoparticle dispersion) of the talc (B), and is about 1 μm. Depending on the average particle size of the primary particles of the talc (B) to be used, the average particle size of the secondary particles of the talc (B) in the polyamide resin composition is more preferably 5 μm or more, and still more preferably 10 μm or more.

A method for measuring the average particle size of the secondary particles is as follows: a molded article obtained by injection-molding a polyamide resin composition is observed with a scanning electron microscope (SEM) at a magnification of 500 times; the maximum lengths of 500 secondary particles having a maximum length larger than the average particle size of the primary particles of the talc (B) are measured; and the average value of the maximum lengths of 100 secondary particles in descending order is calculated.

The polyamide resin composition of the present invention is required to have an exothermic peak present on a high temperature side of a maximum exothermic peak of a crystallization temperature during cooling in a cooling process of measurement by means of a differential scanning calorimeter. The details of the exothermic peak of the crystallization chart during cooling are unknown, but the exothermic peak is considered to depend on the crystals (spherulites) of the polyamide resin formed on the finely dispersed talc. The talc has a nucleating agent effect, and on the surface of the talc in the polyamide resin composition, a crystalline body of the polyamide resin starts to form at a temperature higher than a normal crystallization temperature. When the average particle size of the secondary particles composed of the component (B) is 30 μm or less, the total surface area of the talc increases, whereby it is considered that the nucleating agent effect of the talc becomes remarkable, which provides increased crystallinity to lead to improved mechanical characteristics. At the same time, an effect of improving the adhesion between the talc and the polyamide resin is also considered, and mechanical strength is considered to be synergistically improved. The crystal is likely to be uniformly formed in the molded article, whereby it is considered that the mechanical characteristics of the molded article are improved and stable characteristics are obtained.

The crystallization temperature during cooling (TC2) in the present invention is measured by using a differential scanning calorimeter (DSC), and is a peak temperature (the highest peak when a plurality of peaks appear) obtained by raising the temperature to 300° C. at a temperature raising rate of 20° C./min under a nitrogen stream, retaining the temperature for 5 minutes, and then lowering the temperature to 100° C. at a rate of 10° C./min.

A dispersed phase composed of the component (B) in which the average particle size of the secondary particles is 30 μm or less tends to be easily generated because a higher relative viscosity of the polyamide resin (A) provides a larger shear force during melt-kneading. Specifically, when the relative viscosity of the polyamide resin (A) is 3.0 or more, this effect can be greatly exhibited, which is a preferred aspect.

Meanwhile, even when the relative viscosity of the polyamide resin (A) is 3.0 or less, the production condition is adjusted, which makes it possible to generate the dispersed phase composed of the component (B) in which the average particle size of the secondary particles is 30 μm or less.

In addition to the above, it is also possible, as necessary, to further add a light or heat stabilizer, an antioxidant, an ultraviolet absorber, a light stabilizer, a plasticizer, a lubricant, a crystal nucleating agent, a release agent, an anti-static agent, a combination of a halogen-based flame retardant and antimony trioxide, various phosphoric acid-based flame retardants, melamine-based flame retardants, inorganic pigments, organic pigments, and dyes, or other kinds of polymers and the like within a known range, to the polyamide resin composition of the present invention.

Examples of the stabilizer include organic antioxidants, such as hindered phenol-based antioxidants, sulfur-based antioxidants and phosphorus-based antioxidants, and heat stabilizers, hindered amine-based, benzophenone-based, and imidazole-based light stabilizers and ultraviolet absorbers, metal inactivating agents, and copper compounds. As the copper compound, copper salts of organic carboxylic acids such as cuprous chloride, cuprous bromide, cuprous iodide, cupric chloride, cupric bromide, cupric iodide, cupric phosphate, cupric pyrophosphate, copper sulfide, copper nitrate, and copper acetate can be used. Furthermore, as a constituent component other than the copper compound, it is preferable to contain an alkali metal halide compound. Examples of the alkali metal halide compound include lithium chloride, lithium bromide, lithium iodide, sodium fluoride, sodium chloride, sodium bromide, sodium iodide, potassium fluoride, potassium chloride, potassium bromide, and potassium iodide. These additives may be used not only singly but also in combination of several kinds. The optimum added amount of the stabilizer may be selected, but it is possible to add at most 5 parts by mass of the stabilizer to 100 parts by mass of the polyamide resin (A).

As the flame retardant, a combination of a halogen-based flame retardant with a flame retardant aid is preferable. As the halogen-based flame retardant, brominated polystyrene, brominated polyphenylene ether, a brominated bisphenol-type epoxy-based polymer, a brominated styrene maleic anhydride polymer, a brominated epoxy resin, a brominated phenoxy resin, decabromodiphenyl ether, decabromobiphenyl, brominated polycarbonate, perchlorocyclopentadecane, and a brominated cross-linked aromatic polymer and the like are preferable. Examples of the flame retardant aid include layered silicates such as antimony trioxide, antimony pentoxide, sodium antimonate, zinc stannate, zinc borate, and montmorillonite, a fluorine-based polymer, and silicone. Among these, from the viewpoint of thermal stability, it is preferable that the halogen-based flame retardant is dibrom polystyrene, and the flame retardant aid is a combination of any of antimony trioxide, sodium antimonate, and zinc stannate. Examples of a non-halogen-based flame retardant include melamine cyanurate, red phosphorus, a phosphinic acid metal salt, and a nitrogen-containing phosphoric acid-based compound. In particular, a combination of a phosphinic acid metal salt and a nitrogen-containing phosphoric acid-based compound is preferable. The nitrogen-containing phosphoric acid-based compound includes a reaction product or a mixture of melamine or melamine condensate such as melam or melon with polyphosphoric acid. It is preferable to add a hydrotalcite-based compound or an alkali compound as other flame retardant and/or flame retardant aid in order to prevent the metal corrosion of a mold or the like when these flame retardants are used. The optimum added amount of the flame retardant may be selected, but it is possible to add at most 20 parts by mass of the flame retardant to 100 parts by mass of the polyamide resin (A).

In the polyamide resin composition of the present invention, the total of the polyamide resin (A), the talc (B), the coupling agent (C), and the fatty acid metal salt (D) (the coupling agent (C) and the fatty acid metal salt (D) are optional components) accounts for preferably 85% by mass or more, more preferably 90% by mass or more, and still more preferably 95% by mass or more.

A production apparatus for producing the polyamide resin composition of the present invention is not particularly limited as long as the polyamide resin and the talc can be melt-kneaded, but a single screw extruder, a twin screw extruder, a kneader, a Banbury mixer, and a roll and the like, which are well known to those skilled in the art, can be used as long as the melt-kneading can be performed. Among these, a twin screw extruder is preferably used.

In the case of using the twin screw extruder, in order to improve the dispersibility of the talc, it is preferable to appropriately select an extruder barrel temperature and a screw configuration to control the resin pressure of an extruder plasticizing part in which a non-melt polymer phase and a melt polymer phase are mixed. That is, in a polymer plasticized region where agglomerates of the talc are likely to form, it is important to make the non-melt polymer phase and the melt polymer phase coexist and increase the viscosity of the polymer as a matrix phase to prevent the formation of the agglomerates of the talc due to shear stress and to control internal heat generation due to a shear force, thereby improving dispersion. The resin pressure is preferably about 0.1 to 1 MPa.

As the screw of the twin screw extruder to be used, a full flight screw, a reverse full flight screw, an orthogonal kneading disc, a forward feeding kneading disc, and a reverse feeding kneading disc are appropriately combined. In the present invention, it is preferable to incorporate a forward feeding kneading disc as the screw configuration of the plasticized region.

It is preferable that L/D, which is a ratio of the length L (mm) of the screw to the diameter D (mm) of the same screw, satisfy the relationship of $10 \leq (L/D) \leq 100$. If other operability has no problems, it is preferable that the ratio L/D be smaller from the viewpoint of the fine dispersion of the talc. When the ratio L/D is more than 100, thermal deterioration tends to cause decreased mechanical strength of the resin composition.

The melting temperature of the resin composition during melt-kneading is preferably 180 to 330° C., and more preferably 200 to 300° C. When the melting temperature is lower than 180° C., the resin composition is insufficiently melted, whereby a non-melt gel is apt to frequently form. Conversely, when the melting temperature is higher than 330° C., the resin composition is apt to be thermally deteriorated.

The screw rotation speed N during melt-kneading is preferably 100 to 1,500 rpm, and more preferably 150 to 1,000 rpm. When the screw rotation speed is less than 100 rpm, the talc tends to be less likely to be finely dispersed. Conversely, even when the screw rotation speed is more than 1,500 rpm, the talc tends to be aggregated without being finely dispersed. A discharge amount Q is preferably 5 to 3,000 kg/hr, and more preferably 10 to 2,000 kg/hr. When the discharge amount is less than 5 kg/hr, the dispersibility of the talc tends to decrease. Even when the discharge amount is more than 2,000 kg/hr, the reaggregation of the talc tends to cause deteriorated dispersibility.

Q/N, which is a ratio of the discharge amount Q (unit: kg/hr) to the screw rotation speed N (unit: rpm) during melt-kneading, preferably satisfies $0.01 \leq (Q/N) \leq 1$, and more preferably $0.05 \leq (Q/N) \leq 0.9$. When the ratio Q/N is less than 0.01, thermal deterioration tends to cause decreased mechanical strength of the resin composition. The ratio Q/N of more than 1 causes an insufficient transporting force, whereby the talc is apt to spout. A smaller ratio Q/N tends to cause the talc to be likely to be finely dispersed. This is considered to be because shear between raw material pellets is also added in addition to the screw to promote the fine dispersion of the talc.

It is also possible to introduce a talc, which is apt to cause biting failure into the polyamide resin, from a side opening of the twin screw extruder during extrusion processing, without particular limitation. The component (C) may be added simultaneously with a raw material component other than the talc, or may be applied to the talc in advance, and added. From the viewpoint of the fine dispersion of the talc, it is preferable to introduce the component (C) from an original feed in order to apply more shear.

In order to remove a gas component associated with the talc during melt-kneading, it is preferable to perform vacuum degassing in a melt-kneading part after the completion of plasticization.

Examples

Next, the present invention will be specifically described using Examples and Comparative Examples, but the present invention is not limited thereto.

Characteristics and physical property values shown in the following Examples and Comparative Examples were measured by the following test methods.

1) Average particle size of secondary particles of talc: A cross-sectional cut piece was prepared from a test piece prepared by the following 4) using a microtome, subjected to platinum sputtering, and observed with a scanning electron microscope (SEM) at 500 times. The maximum lengths of 500 secondary particles having a maximum length larger than the average particle size of primary particles of the talc were measured. The average value of the maximum lengths of 100 secondary particles in descending order was calculated as the average particle size of the secondary particles.

2) Flexural strength: measured according to JIS K 7171: 2016.

3) Flexural modulus: measured according to JIS K 7171: 2016.

4) Evaluation of appearance of molded article: Using an injection molding machine EC-100 manufactured by Toshiba Machine Co., Ltd., a test piece having a length of 100 mm, a width of 100 mm, and a thickness of 2 mmt was prepared by injection molding with a cylinder temperature set to the melting point of a polyamide resin (the highest melting point of a plurality of polyamide resins used in combination)+20° C. and a mold temperature set to 90° C. The appearance of the test piece was visually evaluated. The present evaluation was performed in some Examples in order to confirm the effects of blended raw materials.

Very Good: no lifting of a reinforcing material in the entire molded article.

Good: slight lifting of a reinforcing material in the vicinity of a gate or at an end.

Poor: a large amount of lifting of a reinforcing material in the entire molded article.

5) Molding shrinkage: A flat plate (film gate) test piece having a mold dimension of 100 mm×100 mm×3 mm (thickness) was molded in the same manner as in 4), and allowed to stand at 23° C. and 50% relative humidity for 24 hours, followed by measuring the dimensions of the test piece in machine and transverse directions with a caliper with an accuracy of 0.1 mm. Mold shrinkages in the machine and transverse directions were calculated from a mold reference dimension at a mold temperature during molding measured in the same manner in advance.

6) Exothermic peak of crystallization curve during cooling: A DSC measurement apparatus (EXSTAR 6000 manufactured by Seiko Instruments Inc.) was used. When the temperature was raised to 300° C. at a temperature rising rate of 20° C./min under a nitrogen stream, retained for 5 minutes, and then lowered to 100° C. at a rate of 10° C./min, the peak top of a maximum exothermic peak during cooling was defined as TC2, and the presence or absence of an exothermic peak (second peak) was evaluated in a temperature range from the rising of the crystallization curve during cooling to TC2. The presence of the exothermic peak was defined as good, and the absence was defined as poor. A DSC measurement sample was cut out from the vicinity of the central portion of the flat plate of 100 mm×100 mm×2 mm of the 4) Evaluation.

Raw materials used in Examples and Comparative Examples of the present invention are as follows.

The relative viscosity (RV) of a polyamide resin was measured at 20° C. in a state where 0.25 g of the polyamide resin was dissolved in 25 ml of 96% sulfuric acid, and 10 ml of this solution was placed in an Ostwald viscosity tube.

(A11) Polyamide 6: "GLAMIDE T-840" (RV 2.2, melting point: 223° C.) manufactured by Toyobo Co., Ltd.

(A12) Polyamide 6: "1013B" (RV 2.5, melting point: 224° C.) manufactured by Ube Industries, Ltd.

(A13) Polyamide 6: "T-820" (RV 3.1, melting point: 225° C.) manufactured by Toyobo Co., Ltd.

(A2) Polyamide MXD6: "Nylon T-600" (RV 2.1, melting point: 240° C.) manufactured by Toyobo Co., Ltd.

(B1) Talc: "KST-W" (average particle size: 7 μm, apparent specific gravity: 0.4) manufactured by Shokozan Mining Co., Ltd.

(B2) Talc: "Talcan Pawder PK" (average particle size: 10 μm, apparent specific gravity: 0.8) manufactured by Hayashi Kasei Co., Ltd.

(B3) Talc: "FU-51" (average particle size: 13 μm, apparent specific gravity: 0.3) manufactured by Fukuoka Talc Co., Ltd.

(B4) Wollastonite: "FPW-350" (average particle size: 20 μm, apparent specific gravity: 0.6) manufactured by KINSEI MATEC CO., LTD.

(C) Silane-based coupling agent: "KBE-903" (3-aminopropyltriethoxysilane) manufactured by Shin-Etsu Chemical Co., Ltd.

(D1) Fatty acid metal salt: "NP-1500" (magnesium stearate) manufactured by TANNAN KAGAKU KOGYO CO., LTD.

(D2) Fatty acid metal salt: "CS-8CP" (calcium montanate) manufactured by Nitto Chemical Industry Co., Ltd.

(E) Stabilizer: potassium iodide manufactured by Mitsui Chemicals, Inc.

Example 1

Figure 3:
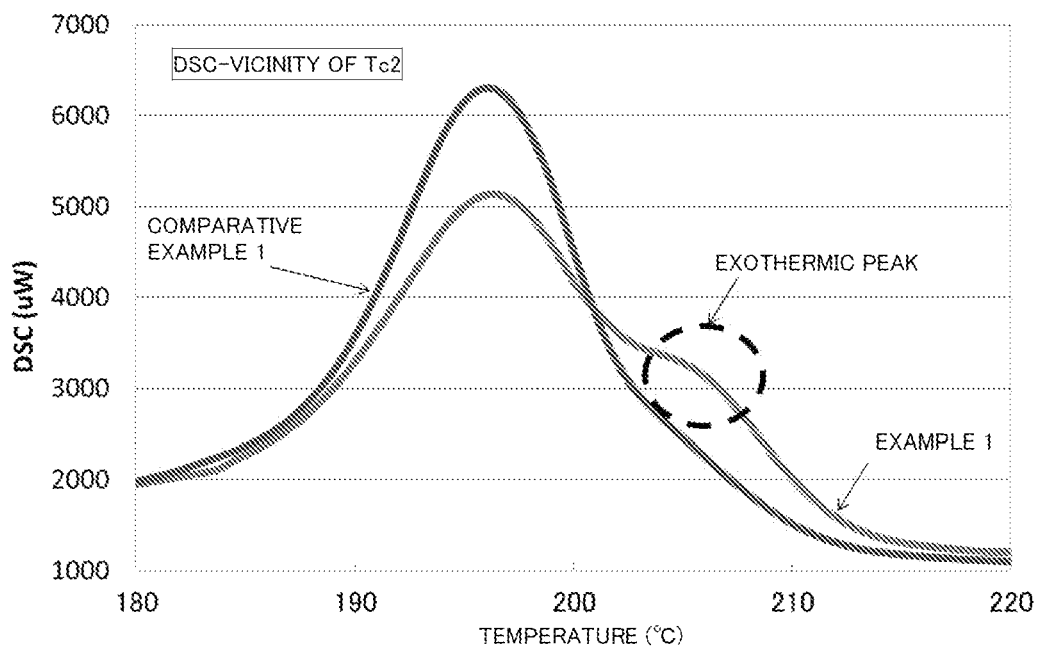
FIG. 3 shows an exothermic peak of a crystallization chart during cooling of each of polyamide resin compositions obtained in Example 1 and Comparative Example 1 by means of a differential scanning calorimeter.

Raw materials were mixed in advance so as to have a composition shown in Table 1. The mixture was supplied to a main supply port of a twin screw extruder (TEM 48 BS manufactured by Toshiba Machine Co., Ltd.: referred to as machine A) of L/D 34, and melt-kneaded. The melt-kneaded product was drawn in a strand form from a die, and then caused to pass through a water tank for cooling and solidifying. The solidified product was cut with a pelletizer to obtain polyamide resin composition pellets. The barrel temperature of the extruder was set to 260° C., and the screw rotation speed and discharge amount of the extruder were set to production conditions in Table 1. The obtained pellets were dried with a hot air dryer until the moisture content was 0.05% or less, and then various characteristics were evaluated. The evaluation results are shown in Table 1. FIG. 1 shows a result of observing the average particle size of secondary particles of a talc with a scanning electron microscope, and FIG. 3 shows a crystallization chart during cooling by means of a differential scanning calorimeter.

Example 2, Comparative Example 1

Figure 2:
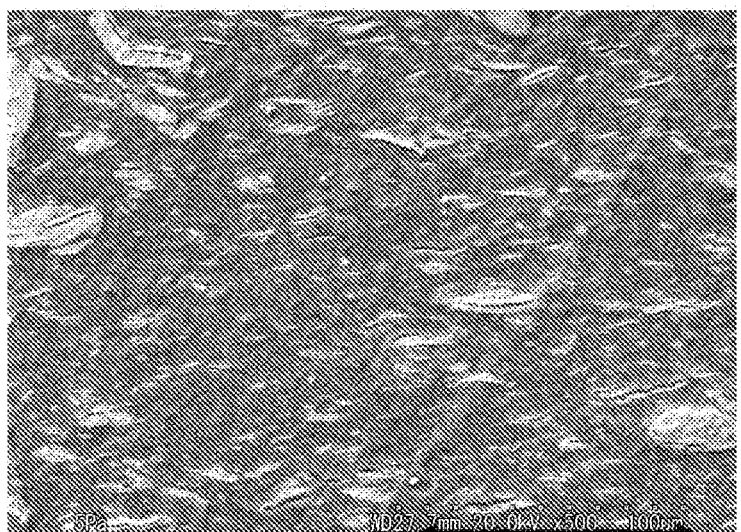
FIG. 2 shows a result of observing the cross section of a test piece obtained in Comparative Example 1 with a scanning electron microscope.

Pellets were prepared and evaluated in the same manner as in Example 1 except that a part of a talc was supplied from a side feed and production conditions in Table 1 were set. FIG. 2 shows a result of observation of the average particle size of the secondary particles of a talc in Comparative Example 1 with a scanning electron microscope, and FIG. 3 shows a crystallization chart during cooling by means of a differential scanning calorimeter.

Examples 3, 5 to 8, 10, Comparative Example 4

Raw materials were mixed in advance so as to have a composition shown in Table 1. The mixture was supplied to a main supply port of a twin screw extruder (TEM 26-SS manufactured by Toshiba Machine Co., Ltd.: referred to as machine B) of L/D 45, and melt-kneaded. The melt-kneaded product was drawn in a strand form from a die, and then caused to pass through a water tank for cooling and solidifying. The solidified product was cut with a pelletizer to obtain polyamide resin composition pellets. The barrel temperature of the extruder was set to 260° C., and the screw rotation speed and discharge amount of the extruder were set to production conditions in Table 1. The obtained pellets were dried with a hot air dryer until the moisture content was 0.05% or less, and then various characteristics were evaluated. The evaluation results are shown in Table 1.

Comparative Example 2

Pellets were prepared and evaluated in the same manner as in Example 3 except that the entire amount of a talc was supplied from a side feed.

Examples 4 and 11, Comparative Example 3

Pellets were prepared and evaluated in the same manner as in Example 3 so as to have a composition shown in Table 1 except that a part of a talc was supplied from a side feed and production conditions in Table 1 were set.

Example 9

Pellets were prepared and evaluated in the same manner as in Example 1 so as to have a composition shown in Table 1.

TABLE 1

| | | Unit | Example 1 | Example 2 | Example 3 | Example 4 | Example 5 | Example 6 | Example 7 | Example 8 |
|---|---|---|---|---|---|---|---|---|---|---|
| Compositions | (A11) Polyamide 6 (RV 2.2) | % By Mass | | | | | 65 | | | |
| | (A12) Polyamide 6 (RV 2.5) | % By Mass | 65 | 65 | 65 | | | 61 | 61 | 61 |
| | (A13) Polyamide 6 (RV 3.1) | % By Mass | | | | 65 | | | | |
| | (A2) Polyamide MXDE (RV 2.1) | % By Mass | | | | | | 4 | 4 | 4 |
| | (B1) Talc (7 μm, Apparent Specific Gravity: 0.4) | % By Mass | | | | | | 34.8 | 34.8 | 34.5 |
| | (B2) Talc (10 μm, Apparent Specific Gravity: 0.8) | % By Mass | 34.3 | 34.3 | 34.3 | 34.3 | | | | |
| | (B3) Talc (13 μm, Apparent Specific Gravity: 0.3) | % By Mass | | | | | 34.3 | | | |
| | (B4) Wollastonite | % By Mass | | | | | | | | |
| | (C) Silane-based Coupling Agent | % By Mass | 0.3 | 0.3 | 0.3 | 0.3 | 0.3 | 0.3 | — | 0.3 |
| | (D1) Fatty Acid Metal Salt | % By Mass | 0.2 | 0.2 | 0.2 | 0.2 | 0.2 | 0.2 | — | — |
| | (D2) Fatty Acid Metal Salt | % By Mass | | | | | | | | |
| | (E) Stabilizer | % By Mass | 0.2 | 0.2 | 0.2 | 0.2 | 0.2 | 0.2 | 0.2 | 0.2 |
| Production condition | Type of Machine | — | A | A | B | B | B | B | B | B |
| | Discharge Amount | kg/hr | 240 | 230 | 45 | 45 | 45 | 45 | 45 | 45 |
| | Screw Roation Speed | rpm | 440 | 360 | 750 | 750 | 750 | 750 | 750 | 750 |
| | Q/N | — | 0.55 | 0.84 | 0.06 | 0.06 | 0.06 | 0.06 | 0.06 | 0.06 |
| | Talc Supply Method — Original Feed | wt % | 100 | 45 | 100 | 10 | 100 | 100 | 100 | 100 |
| | Talc Supply Method — Side Feed | wt % | — | 55 | — | 50 | — | — | — | — |
| Evaluation Results | Average Particle Size of Secondary Particles of Talc | μm | 16 | 24 | 17 | 16 | 19 | 16 | 16 | 16 |
| | Flexural Strength | MPa | 136 | 137 | 135 | 138 | 123 | 140 | 124 | 137 |
| | Flexural Modulus | GPa | 8.1 | 7.3 | 8.0 | 7.2 | 7.0 | 8.3 | 7.0 | 8.0 |
| | Appearance of Molded Article | — | — | — | — | — | — | Very Good | Good | Good |

TABLE 1-continued

| | | | | | | | | | |
|---|---|---|---|---|---|---|---|---|---|
| Molding Shrinkage (Thickness: 3 mm) | Machine Direction | % | 0.35 | 0.40 | 0.40 | 0.40 | 0.40 | 0.35 | 0.35 | 0.35 |
| | Transverse Direction | % | 0.40 | 0.55 | 0.50 | 0.50 | 0.50 | 0.40 | 0.40 | 0.40 |
| Exothermic Peak of Crystallization Curve During Cooling | | — | Presence | Presence | Presence | Presence | Presence | Presence | Presence | Presence |

| | | Unit | Example 9 | Example 10 | Example 11 | Comparative Example 1 | Comparative Example 2 | Comparative Example 3 | Comparative Example 4 |
|---|---|---|---|---|---|---|---|---|---|
| Compositions | (A11) Polyamide 6 (RV 2.2) | % By Mass | | | | | | | |
| | (A12) Polyamide 6 (RV 2.5) | % By Mass | 65 | 78 | 56 | 65 | 65 | 65 | 65 |
| | (A13) Polyamide 6 (RV 3.1) | % By Mass | | | | | | | |
| | (A2) Polyamide MXDE (RV 2.1) | % By Mass | | | | | | | |
| | (B1) Talc (7 μm, Apparent Specific Gravity: 0.4) | % By Mass | | 21.3 | 43.3 | | | | |
| | (B2) Talc (10 μm, Apparent Specific Gravity: 0.8) | % By Mass | 34.3 | | | 34.3 | 34.3 | 34.3 | |
| | (B3) Talc (13 μm, Apparent Specific Gravity: 0.3) | % By Mass | | | | | | | |
| | (B4) Wollastonite | % By Mass | | | | | | | 34.3 |
| | (C) Silane-based Coupling Agent | % By Mass | 0.3 | 0.3 | 0.3 | 0.3 | 0.3 | 0.3 | 0.3 |
| | (D1) Fatty Acid Metal Salt | % By Mass | — | 0.2 | 0.2 | 0.2 | 0.2 | 0.2 | 0.2 |
| | (D2) Fatty Acid Metal Salt | % By Mass | 0.2 | | | | | | |
| | (E) Stabilizer | % By Mass | 0.2 | 0.2 | 0.2 | 0.2 | 0.2 | 0.2 | 0.2 |
| Production condition | Type of Machine | — | A | B | B | A | B | B | B |
| | Discharge Amount | kg/hr | 240 | 45 | 45 | 240 | 45 | 25 | 45 |
| | Screw Rotation Speed | rpm | 440 | 750 | 750 | 290 | 750 | 90 | 750 |
| | Q/N | — | 0.55 | 0.06 | 0.06 | 0.83 | 0.06 | 0.28 | 0.06 |
| | Talc Supply Method — Original Feed | wt % | 100 | 100 | 45 | 10 | — | 45 | 100 |
| | Side Feed | wt % | — | — | 55 | 90 | 100 | 55 | — |
| Evaluation Results | Average Particle Size of Secondary Particles of Talc | μm | 16 | 19 | 23 | 33 | 35 | 34 | 74 |
| | Flexural Strength | MPa | 136 | 126 | 139 | 115 | 115 | 118 | 97 |
| | Flexural Modulus | GPa | 8.1 | 7.4 | 7.6 | 6.4 | 6.3 | 6.6 | 3.2 |
| | Appearance of Molded Article | — | — | — | — | — | — | — | — |
| | Molding Shrinkage (Thickness: 3 mm) Machine Direction | % | 0.35 | 0.45 | 0.30 | 0.55 | 0.55 | 0.60 | 1.10 |
| | Transverse Direction | % | 0.40 | 0.55 | 0.35 | 0.75 | 0.75 | 0.75 | 0.65 |
| | Exothermic Peak of Crystallization Curve During Cooling | — | Presence | Presence | Presence | Absence | Absence | Absence | Absence |

From Table 1, the polyamide resin and the talc are contained in predetermined amounts, and the average particle size of the secondary particles of the talc falls within a predetermined range, whereby a second peak appears in a crystallization curve during cooling, and a polyamide resin composition having excellent flexural characteristics and a small molding shrinkage is obtained. Since similar results are obtained even in different machines, it can be said that variations in physical characteristics such as a molding shrinkage, mechanical characteristics, and a heat distortion temperature of the polyamide resin composition are suppressed among different production machines or different production lots, whereby characteristics within desired ranges are stably obtained.

INDUSTRIAL APPLICABILITY

The molded article formed from the polyamide composition of the present invention has remarkably excellent mechanical characteristics, heat resistance, and dimensional stability and the like. In the molded article, variations in physical characteristics such as a molding shrinkage, mechanical characteristics, and a heat distortion temperature are suppressed. Therefore, the molded article can be applied to a wide range of uses, and is particularly most suitable for automobile interior parts such as a console and a cup holder.

The invention claimed is:

1. A polyamide resin composition comprising:
50 to 90% by mass of a crystalline polyamide resin (A); and
9 to 49% by mass of a talc (B),
wherein:
an average particle size of secondary particles of the talc (B) in the polyamide resin composition is 5 to 30 μm;
the secondary particles are aggregates of primary particles of the talc (B);
the polyamide resin composition has an exothermic peak at a temperature higher than a maximum exothermic peak measured during a cooling process, as measured by a differential scanning calorimeter; and
the exothermic peak and the maximum exothermic peak are measured by a process that includes 1) to 3) below, the cooling process is identified as 3) below:
1) The temperature was raised to 300° C. at a temperature rising rate of 20° C./min under a nitrogen stream,
2) The temperature was retained for 5 minutes, and
3) The temperature was lowered to 100° C. at a rate of 10° C./min.

2. The polyamide resin composition according to claim 1, wherein the polyamide resin composition further contains a coupling agent (C) and a fatty acid metal salt (D).

3. The polyamide resin composition according to claim 1, wherein the crystalline polyamide resin (A) contains an aliphatic polyamide resin.

4. The polyamide resin composition according to claim 1, wherein the crystalline polyamide resin (A) contains polymetaxylylene adipamide.

5. The polyamide resin composition according to claim 1, wherein the crystalline polyamide resin (A) contains a polyamide 6.

6. The polyamide resin composition according to claim 1, further comprising at least one fatty acid metal salt selected from the group consisting of calcium stearate, magnesium stearate, zinc stearate, calcium behenate, magnesium behenate, zinc behenate, zinc montanate, calcium montanate, and magnesium montanite.

7. The polyamide resin composition according to claim 1, further comprising magnesium stearate.

8. The polyamide resin composition according to claim 1, further comprising calcium montanate.

9. The polyamide resin composition according to claim 1, wherein a content of the crystalline polyamide resin (A) is 55 to 80% by mass.

10. The polyamide resin composition according to claim 1, wherein a content of the crystalline polyamide resin (A) is 56 to 74% by mass.

11. The polyamide resin composition according to claim 1, wherein a content of the crystalline polyamide resin (A) is 60 to 68% by mass.

12. The polyamide resin composition according to claim 1, wherein a content of the talc (B) is 19 to 44% by mass.

13. The polyamide resin composition according to claim 1, wherein a content of the talc (B) is 25 to 43% by mass.

14. The polyamide resin composition according to claim 1, wherein a content of the talc (B) is 31 to 39% by mass.

15. The polyamide resin composition according to claim 1, wherein the average particle size of the secondary particles of the talc (B) in the polyamide resin composition is 5 to 25 μm.

16. The polyamide resin composition according to claim 1, wherein the average particle size of the secondary particles of the talc (B) in the polyamide resin composition is 5 to 20 μm.

17. The polyamide resin composition according to claim 1, wherein the average particle size of the secondary particles of the talc (B) in the polyamide resin composition is 10 to 30 μm.

18. The polyamide resin composition according to claim 1, wherein the average particle size of the secondary particles of the talc (B) in the polyamide resin composition is 16 to 30 μm.

19. The polyamide resin composition according to claim 1, wherein the polyamide resin composition is in pellet form.

* * * * *